Patented Aug. 7, 1951

2,563,035

UNITED STATES PATENT OFFICE 2,563,035

PREPARATION OF NITROGEN AND SULFUR CONTAINING BETA-SUBSTITUTED CARBOXYLIC ACIDS

Thomas L. Gresham and Forrest W. Shaver, Akron, Ohio, assignors to The B. F. Goodrich Company, New York, N. Y., a corporation of New York No Drawing. Application July 5, 1949, Serial No. 103,167

6 Claims. (Cl. 260—534)

This invention relates to the preparation of nitrogen- and sulfur-containing beta-substituted carboxylic acids, particularly propionic acids, and is especially concerned with the preparation of such compounds by the reaction of beta-lactones with certain nitrogen- and sulfur-containing compounds which are referred to hereinafter as substituted thioureas.

It is disclosed in U. S. Patent 2,356,459 to Frederick E. Küng that beta-lactones, that is lactones or inner esters of beta-hydroxy carboxylic acids may be obtained in good yields by the reaction of a ketene with an aldehyde or ketone. In this manner beta-propiolactone (also called hydracrylic acid lactone) which has the structure

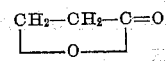

is economically obtained from ketene and formaldehyde.

It has now been discovered that beta-propiolactone, and also the other saturated aliphatic beta-lactones, will react with substituted thioureas of the formula

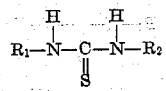

wherein $R_1$ is a radical selected from the class consisting of hydrocarbon radicals, preferably those containing from 1 to 7 carbon atoms, acyl radicals, preferably those containing from 1 to 7 carbon atoms, carboxy and carbo-alkoxy substituted alkyl radicals, preferably those containing from 1 to 7 carbon atoms, the amino radical, and radicals of the structure

wherein X is selected from the class consisting of O, S and NH; and $R_2$ is either a radical of the class represented by $R_1$ or a hydrogen atom, preferably the latter, to produce beta-substituted carboxylic acids in which a thio linkage —S—, from the sulfur of the substituted thiourea is attached on the one hand to a carbon atom in turn attached by a double bond to a nitrogen atom and on the other hand to a carbon atom in beta position to a carboxyl group. The equation for the reaction is as follows:

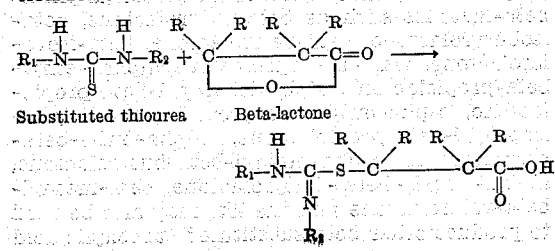

Substituted thiourea    Beta-lactone

No special conditions for the reaction are necessary, the reaction proceeding whenever it is possible to bring the reactants into effective contact with one another. This is ordinarily accomplished by the use of a solvent for the reactants, polar solvents being preferred. Since many of substituted thioureas and many beta-lactones are soluble in water, the use of water as the solvent for the reactants is an especially preferred procedure. In this event the beta-substituted product, being generally insoluble in water, is precipitated during the reaction and is thus readily separated from the reaction medium. Other polar solvents which dissolve the reactants such as alcohols, organic acids, organic nitriles, and the like, however, may also be used. The temperature at which the reaction is effected is not critical but is preferably from 0 to 100° C., more preferably from 0 to 50° C. Proportions of reactants may be varied widely using an excess of either of the reactants if desired, but in general the use of substantially equimolecular proportions of the reactants is preferred.

Phenyl thiourea, allyl thiourea, dithiobiuret and thiosemicarbazide are representative compounds within the class of substituted thioureas hereinabove set forth and beta-propiolactone is a representative and preferred beta-lactone. Accordingly, the invention will be specifically illustrated by operative specific examples of the reaction of each of these four substituted thioureas with beta-propiolactone to produce beta-substituted propionic acids.

Example I 38 parts (.25 mole) of phenyl thiourea are placed in 200 parts of water. 18 parts (.25 mole) of beta-propiolactone are added slowly and with constant stirring whereupon the solution thickens and a precipitate forms. During the addition of the lactone the temperature is constant at 28° C. The product is removed from the reaction mixture by filtering. 39.98 parts (72%) of beta-phenylisothioureido propionic acid (M. P. 114°–117° C.) are obtained.

Example II 38.6 parts (.33 mole) of allyl thiourea are added to 100 parts of water and 24 parts (.33 mole) of beta-propiolactone are added with constant stirring, the temperature being maintained at about 30° C. After the addition of the lactone is complete the water is removed by distillation at reduced pressure leaving an oily residue which crystallizes on standing. The crystalline material is dissolved in a minimum amount of water and acetone and recrystallized. 37 parts (59%) of beta-allyl-isothioureido propionic acid (M. P. 113° C.–115° C.) are obtained. The acid is soluble in water and insoluble in organic solvents.

The above Examples I and II illustrate the reaction of hydrocarbon-substituted thioureas with beta-lactones. Other hydrocarbon-substituted thioureas which can be used in place of the phenyl thiourea and allyl thiourea of the above examples include methyl ethyl, propyl, butyl, benzoyl, diethyl, dimethyl, dibutyl and diphenyl thioureas as well as other compounds of the structure

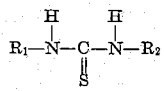

where $R_1$ is hydrocarbon and $R_2$ is hydrogen or a hydrocarbon radical. Similarly, substituted thioureas of the above structure where $R_1$ is an acyl group or a carboxy or carboalkoxy substituted alkyl group and $R_2$ is the same or hydrogen, can also be substituted for the phenyl and allyl thiourea of the above examples. Among such substituted thioureas are acetyl thiourea, propionyl thiourea, benzoyl thiourea, thiohydantoic acid (which is carboxymethyl thiourea) and ethyl thiohydantoate (which is carboethoxymethyl thiourea).

Example III 27 parts (.2 mole) of dithiobiuret are added to 100 parts of water. 29 parts (.4 mole) of beta-propiolactone are slowly added with stirring, the temperature of the reaction mixture being maintained at from 20°–30° C. A solid begins to precipitate immediately and after the lactone addition is complete, the solid material is removed by filtering. Upon crystallization from boiling water, 96 parts (86%) of a compound melting at 161°–163° C. and possessing the formula

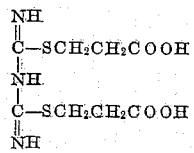

are obtained.

The above Example III of the reaction between beta-propiolactone and dithiobiuret illustrates the reaction of beta lactones with substituted thioureas of the structure

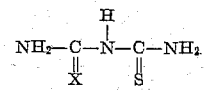

where X is O, S, and NH. As noted in the example dithiobiuret reacts with two lactone molecules because of the presence of the two equivalent sulfur atoms. If only one mole of lactone is used the product is the compound of the structure

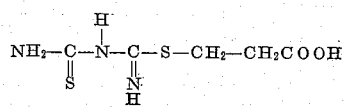

Similarly, when biuret,

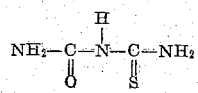

and one mole of beta-propiolactone are reacted as in Example III the product is the compound of the structure

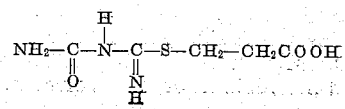

and when guanyl thiourea,

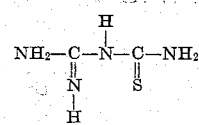

is reacted with one mole of beta-propiolactone the product is the compound of the structure

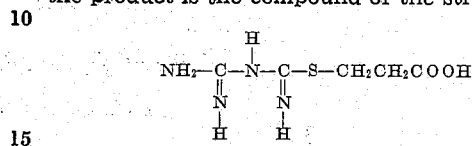

Example IV 10 parts (.1 mole) of thiosemicarbazide are added with stirring to 50 parts of water. 7.2 parts (.1 mole) of beta-propiolactone are then slowly stirred into this mixture, the temperature of the reaction mixture being maintained at from 10°–15° C. When the lactone addition is complete the water is removed by distillation at reduced pressure and upon cooling the residue crystallizes. This product is recrystallized from water and methyl alcohol to give 11.4 parts (67%) of a compound (M. P. 140°–142° C.) possessing the formula

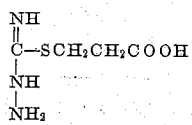

Example IV illustrates the reaction between beta-lactones and substituted thioureas of the structure

wherein $R_1$ is the amino radical and $R_2$ is either hydrogen or the amino radical. When thiocarbazide

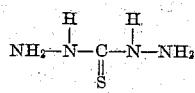

(where $R_1$ and $R_2$ are both amino) is used in place of thiosemicarbazide the product is the compound of the structure

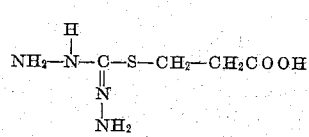

Although beta-propiolactone, the simplest possible beta-lactone, is the preferred beta-lactone for use in this invention because of its low cost, its solubility in water and the ease with which the reaction is carried out, the homologs of beta-propiolactone, that is, other saturated aliphatic beta-lactones such as beta-butyrolactone, beta-isobutyrolactone, beta-valerolactone, beta-isovalerolactone, beta - n - caprolactone, alpha - ethyl-beta-propiolactone, alpha-isopropyl-beta-propiolactone, alpha-butyl-beta-propiolactone, alpha-isopropyl-beta-propiolactone, alpha-butyl-beta-propiolactone, alpha-methyl-beta-butyrolactone, alpha - ethyl - beta - butyrolactone, beta-methyl-beta-valerolactone and the like may also be used to produce other beta substituted carboxylic acid compounds. All these lactones possess the general structure

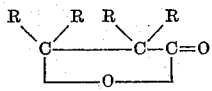

wherein R is hydrogen or a lower alkyl group, so that the lactone preferably contains from 3 to 8 carbon atoms.

The nitrogen and sulfur containing beta-substituted carboxylic acid compounds obtained by the reaction described are generally solid organic compounds which are useful as intermediates in the preparation of other compounds and for various other purposes. They may be hydrolyzed to yield beta-mercapto carboxylic acids. In many instances they may be cyclicized to produce heterocyclic nitrogen and sulfur containing compounds. They also possess utility as insecticides and fungicides, and in the preparation of physiologically active-compositions.

Numerous other modifications and variations in the method of effecting the reaction and in the materials therein used will be obvious to those skilled in the art and are within the spirit and scope of the invention as defined in the appended claims.

This application is a continuation-in-part of the copending application Serial No. 620,661, filed October 5, 1945, now U. S. Patent 2,474,838.

We claim:

1. The method which comprises reacting beta-propiolactone with phenyl thiourea and recovering beta-(phenyl-isothioureido) propionic acid.

2. The method which comprises reacting two moles of beta-propiolactone with one mole of dithiobiuret and recovering the compound of the formula

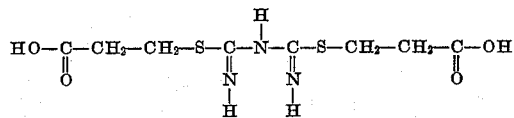

3. The method which comprises reacting beta-propiolactone with thiosemicarbazide and recovering the compound of the formula

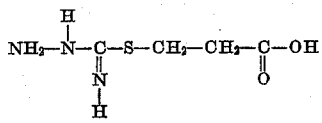

4. Beta-phenyl-isothioureido propionic acid.

5. The method which comprises reacting a saturated aliphatic beta-lactone with a nitrogen and sulfur containing compound possessing the structure

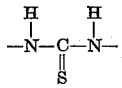

and selected from the class consisting of hydrocarbon substituted thioureas of the formula

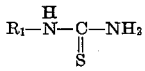

wherein $R_1$ represents a hydrocarbon radical, biuret, dithiobiuret, thiocarbazide and thiosemicarbazide whereby to produce a carboxylic acid having the group

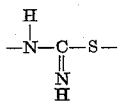

attached by the sulfur atom to the carbon atom in the beta position.

6. The method of claim 5 wherein the lactone is beta-propiolactone.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,474,838 | Gresham et al. | July 5, 1949 |

OTHER REFERENCES

Johansson: Ber. Deut. Chem., vol. 48, pp. 1262–1266 (1915).
Chem. Zentral, vol. 1916, II, pp. 557–558.
Freund et al.: Beilstein (Handbook, 4th ed.), vol. 3, p. 658 (1921).
De: Chem. Abstracts, vol. 21, p. 2128 (1927).
Popovici: Chem. Abstracts, vol. 27, p. 1337 (1933).